Sept. 25, 1934.  W. E. BURNS  1,974,641
CAN BODY PREHEATER HORN
Filed Oct. 16, 1929
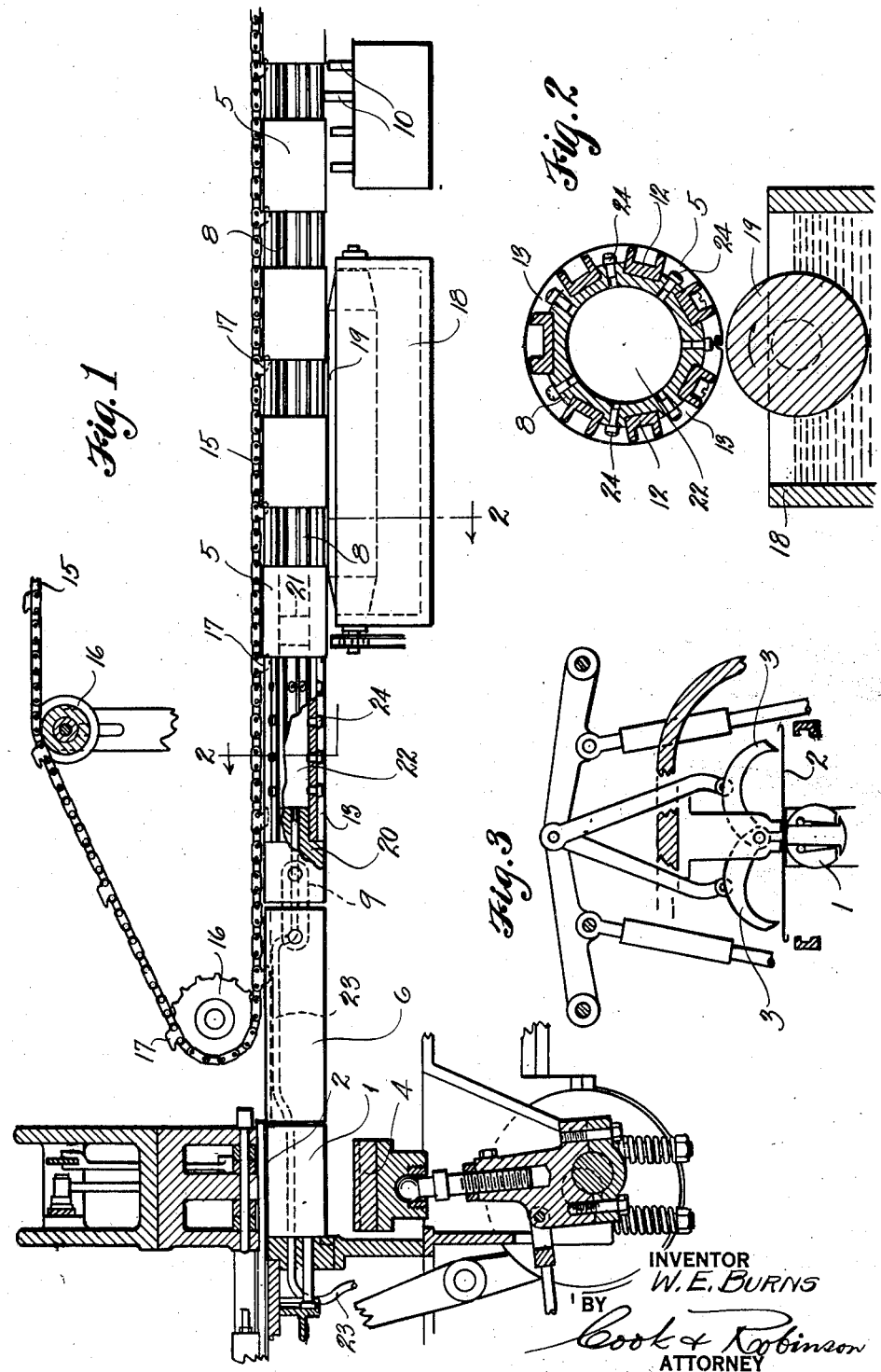
INVENTOR
W. E. BURNS
BY
Cook & Robinson
ATTORNEY Patented Sept. 25, 1934

1,974,641

UNITED STATES PATENT OFFICE 1,974,641

CAN BODY PREHEATER HORN

Wilfred E. Burns, Burlingame, Calif., assignor to M. J. B. Co., San Francisco, Calif., a corporation Application October 16, 1929, Serial No. 399,984

5 Claims. (Cl. 113—61)

This invention relates to can body forming machines, and it has reference in particular to certain improvements in the horn along which the can bodies are delivered for soldering their side seams.

Briefly, to better explain the purpose of the present invention, it will here be stated that the machine with which the present horn is associated is of that character which forms cylindrical can bodies; these bodies being made from tin blanks which are delivered by a feed mechanism into the machine and are advanced in succession through rolling, notching and flanging stations and are delivered to the forming horn with their opposite end portions formed with oppositely turned hooks. Here a certain wing clamp mechanism operates to bend the blank ends about the horn into overlapped relation, then the forming horn is slightly expanded to cause the hooked ends to be seated one within the other and, while in this relation, they are bumped so as to clinch them together in a connecting seam. After the ends are joined in this way, the can bodies are advanced onto and moved along a horn that is extended across a solder pot in which a revolving roller operates to carry molten solder from the pot up against the side seams of the bodies to seal them permanently together in an air-tight connection. It might be mentioned that other types of seams, or even lap joints might be employed but in any event it has been found that the application of the molten solder to the seams causes an undesirable warping of the can body along the seam. This is by reason of the fact that surfaces not touched by the solder do not expand to the same degree as parts in intimate contact therewith. Warping of this nature is very detrimental, especially in cans of larger size, and therefore, it has been the object of the present invention to provide means for overcoming this warping resultant to the application of solder to the seam.

More specifically, the present invention resides in the provision of means in connection with the solder horn whereby each can body is caused, just prior to reaching the soldering station, to be heated throughout its entire circumference to a degree substantially that to which the seam is later subjected by application of the solder, thereby effecting expansion of the entire body rather than the expansion of a relatively narrow strip embracing only the seam and portions of the body closely adjacent thereto. The invention contemplates the provision of heating means in the nature of gas burners located in the horn in advance of the soldering station and adapted to discharge jets of flame into and against the inner surface of the can bodies as they are delivered along the horn.

Other objects of the invention reside in the various details of construction and in the combination of parts, as will hereinafter be described.

In accomplishing these objects, I have provided the improved details of construction, the preferred forms of which are illustrated in the accompanying drawing, wherein—

Figure 1 is a side elevation of a horn constructed in accordance with the present invention; this being shown as associated with certain parts of a body forming machine and with a solder pot and conveyer mechanism.

Figure 2 is an enlarged, cross sectional view taken on the line 2—2 in Figure 1.

Figure 3 is a diagrammatic view illustrating a step in forming the can body.

Referring more in detail to the drawing—

1 designates the forming horn of the body machine about which the tin, body blanks 2 are bent into cylindrical form and their ends joined together. This bending of the blanks is effected in the present instance by means of a pair of pivotally mounted wing clamps 3—3 which operate downwardly against opposite end portions of the blanks, as they are advanced to a position centrally over the horn 1, and bend these end portions downwardly about the horn into an overlapped relation. Then, certain devices operate to slightly expand the horn diametrically, thus causing the hooked end portions of the blanks to be seated one within the other. A bumper bar 4 then operates upwardly against the hooked ends to close them together in a permanently connected seam. After the ends of the blanks are thus joined together, the cylindrical bodies 5 are advanced from the horn 1 onto a continuing portion 6, known in the present type of machine as the auxiliary bumping horn, but which for some types of bodies is omitted. From this auxiliary horn, they are advanced onto the main horn 8; this being connected by means of a link 9 to the auxiliary bumping horn, and it is supported at intervals along its length by devices, each consisting of a series of posts 10 which operate downwardly and in a properly synchronized order to permit the can bodies to pass along the horn past the supporting devices. The horn 8 consists, in the present instance, of an elongated tubular body with a plurality of longitudinal ribs 12 on its outer surface over which the can bodies are adapted to slide, there being spaces 13 intermediate the ribs.

The means employed for conveying the can bodies along the several horns consists of a moving chain belt 15 operating in suitable supporting carriers 16 along the top of the horn, and the chain has lugs or pushers 17 fixed thereto at regular intervals for engaging the rear edges of the can bodies.

Below the horn 8, is a solder pot 18 and supported rotatably therein, parallel with and closely adjacent the under side of the horn, is a roller 19 which operates, when revolved, to carry molten solder on its surface from the pot up against the seams of the can bodies as they are moved along the horn. It is this application of the solder that, heretofore, has caused the warping of the bodies.

The present invention resides in the provision of means for heating the can bodies equally throughout their entire circumference just prior to their reaching the soldering station and to a degree substantially that to which the seams are subjected on soldering. In the present instance, this is accomplished as follows: That end of the horn 8 that is adjacent the auxiliary horn 6 is closed off by the end plug 20 and a partition 21 is fitted in the horn in spaced relation to the plug 20 to provide a closed chamber 22. This is supplied with any suitable inflammable gas which may be delivered thereto in any suitable manner, preferably, through a small, flexible tube 23 which leads to the chamber through the forming horn 1, auxiliary horn 6 and the plug 20. Threaded through the side walls of the chamber 22 are burners 24, here shown to be arranged in rows between the ribs of the horn and in sufficient number to insure a flame that will fill and effectively heat the can bodies as the latter are moved thereover to a degree substantially that to which the seams are heated by application of the solder. The chamber 22 may be extended to any length necessary and the gas burners arranged in any suitable manner and in sufficient number to obtain the results desired.

It has been found, by use of a body preheating means of this character, that the bodies will be heated and expanded to such an extent that the application of hot solder to the side seams will not effect warping by reason of an unequal expansion of the body and will insure bodies that are perfectly true. It has been found also that this pre-heating operation effects a better closing of the seams, since the solder is not as quickly cooled and is applied against hot metal instead of against cold metal.

It is not intended that the present invention be limited to any specific heating means or that it be confined to any particular type of horn construction, but that it broadly include any means for preheating the cans prior to the application of solder to the side seams. This also is to apply to what are known as outside horns as well as to the inside horns.

Having thus described my invention, what I claim as new therein and desire to secure by Letters Patent, is:

1. In a can making machine, the combination with a solder applying roll, an inside horn and a conveyer mechanism operable to move side seamed can bodies along the horn and along the roll for an application of molten solder to their side seams, of a heater section included in the horn as a part thereof closely adjacent the solder station and over which the can bodies are delivered in passing to the solder roll for a uniform application of heat throughout their entire area.

2. In a can making machine, the combination with a solder applying roll, an inside horn and a conveyer operable to move can bodies along the horn and across the roll for an application of solder to their side seams, of a gas chamber formed within the horn in advance of the soldering station, gas burners opening from said chamber to the outside of the horn and over which the can bodies are passed for an interior application of heat just prior to the application of solder.

3. In a can making machine, the combination with a solder applying roll, an inside horn and a conveyer operable to advance can bodies along the horn and past the roll for an application of solder to their side seams, of a gas chamber formed within the horn in advance of the solder roll, a gas supply tube leading thereinto through the forward end of the horn, burner jets opening from the chamber to the outside of the horn and over which the can bodies are moved in intimate contact to receive an application of heat of high degree just prior to the application of solder thereto.

4. In a can making machine, the combination with a solder applying roll, of a tubular horn having longitudinal ribs thereon and a conveyer operable to move can bodies along the horn and past the roll for an application of solder to their side seams; said horn having means therein in advance of the solder roll, closing off a gas chamber, and burner jets opening from said chamber to the outside of the horn between the ribs thereof for an application of heat to the can bodies in passing to the solder roll.

5. In a can making machine, the combination with a solder applying element, a horn and means for conveying side seamed can bodies along the horn to the solder applying element, of heating elements arranged for producing a heated area through which the can bodies are conveyed in their delivery to the solder applying element, whereby the material of the body extending back from the seam and at opposite sides thereof will be heated to a temperature approaching that of the solder to be applied to the seam.

WILFRED E. BURNS.